United States Patent
Tsai et al.

(10) Patent No.: US 10,289,211 B2
(45) Date of Patent: May 14, 2019

(54) KEYBOARD APPARATUS AND DETECTION METHOD FOR STATUS OF KEYS THEREOF

(71) Applicants: An-Chi Tsai, Taipei (TW); Chia-Yuan Chou, Hsinchu (TW)

(72) Inventors: An-Chi Tsai, Taipei (TW); Chia-Yuan Chou, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 331 days.

(21) Appl. No.: 15/149,193

(22) Filed: May 9, 2016

(65) Prior Publication Data

US 2017/0168589 A1 Jun. 15, 2017

(30) Foreign Application Priority Data

Dec. 14, 2015 (TW) .............................. 104141978 A

(51) Int. Cl.
*G09G 5/00* (2006.01)
*G06F 3/023* (2006.01)

(52) U.S. Cl.
CPC ............ *G06F 3/023* (2013.01); *G06F 3/0233* (2013.01)

(58) Field of Classification Search
CPC ................................ G06F 3/023; G06F 3/0233
USPC ........................................................ 345/168
See application file for complete search history.

(56) References Cited

U.S. PATENT DOCUMENTS

| | | | |
|---|---|---|---|
| 4,709,228 A | 11/1987 | Hiicking et al. | |
| 5,448,236 A | 9/1995 | Shiga | |
| 6,281,886 B1 | 8/2001 | Ranieri | |
| 6,885,317 B1 | 4/2005 | Gutowitz | |
| 7,161,505 B1 | 1/2007 | Falik et al. | |
| 8,754,790 B2 | 6/2014 | Lin | |
| 2009/0096640 A1* | 4/2009 | Sherman | H03M 11/003 341/24 |
| 2010/0066572 A1* | 3/2010 | Dietz | H01H 13/702 341/34 |
| 2010/0253553 A1* | 10/2010 | Liu | H03M 11/003 341/24 |
| 2010/0253554 A1* | 10/2010 | Huang | H03M 11/003 341/26 |

(Continued)

FOREIGN PATENT DOCUMENTS

| | | |
|---|---|---|
| TW | I476638 | 3/2015 |
| TW | I499220 | 9/2015 |

OTHER PUBLICATIONS

"Office Action of Taiwan Counterpart Application," dated Nov. 29, 2016, p. 1-p. 4, in which the listed references were cited.

*Primary Examiner* — Jonathan M Blancha
(74) *Attorney, Agent, or Firm* — JCIPRNET

(57) ABSTRACT

A keyboard apparatus and a detection method for status of keys thereof are provided. The detection method includes the following steps. First lines of a key module in the keyboard apparatus are driven to a first potential. Whether any key on each of second lines in the key module is pressed is detected as a first detection result. The second lines are driven to the first potential. Whether any key on each of the first lines is pressed is detected as a second detection result. One of the first lines is sequentially selected, and a press status of each key on the selected first line is scanned through the second lines so as to generate a coarse scan result. The press status of each key is obtained and whether the press status is misjudged is determined according to the first and the second detection results and the coarse scan result.

26 Claims, 13 Drawing Sheets

(56) References Cited

U.S. PATENT DOCUMENTS

2011/0078476 A1    3/2011   Han

* cited by examiner

| R01 (1) | R02 (1) | R03 (1) | R04 (1) | R05 (1) |
|---|---|---|---|---|
| R06 (1) | R07 (1) | R08 (1) | R09 (1) | R10 (1) |
| R11 (0) | R12 (1) | R13 (0) | R14 (1) | R15 (1) |
| R16 (0) | R17 (1) | R18 (1) | R19 (1) | R20 (1) |
| R21 (1) | R22 (1) | R23 (1) | R24 (1) | R25 (1) |

FIG. 7A

| R01 (0) | R02 (1) | R03 (0) | R04 (0) | R05 (0) |
|---|---|---|---|---|
| R06 (1) | R07 (1) | R08 (1) | R09 (1) | R10 (1) |
| R11 (0) | R12 (1) | R13 (0) | R14 (1) | R15 (1) |
| R16 (0) | R17 (1) | R18 (1) | R19 (1) | R20 (1) |
| R21 (1) | R22 (1) | R23 (1) | R24 (1) | R25 (1) |

FIG. 7B

KEYBOARD APPARATUS AND DETECTION METHOD FOR STATUS OF KEYS THEREOF

CROSS-REFERENCE TO RELATED APPLICATION

This application claims the priority benefit of Taiwan application serial no. 104141978, filed on Dec. 14, 2015. The entirety of the above-mentioned patent application is hereby incorporated by reference herein and made a part of this specification.

BACKGROUND OF THE INVENTION

1. Field of the Invention

The invention relates to a keyboard apparatus, and more particularly, relates to a keyboard apparatus capable of avoiding misjudgment due to ghost key and a detection method for status of keys thereof.

2. Description of Related Art

Referring to FIG. 1, FIG. 1 is a schematic diagram of a conventional keyboard apparatus 100. The keyboard apparatus 100 includes keys SW1 to SW4 and comparators 10 and 20. The key SW1 is coupled between a driving line DL1 and a sensing line SL1. The key SW2 is coupled between the driving line DL1 and a sensing line SL2. The key SW3 is coupled between a driving line DL2 and the sensing line SL1. The key SW4 is coupled between the driving line DL2 and the sensing line SL2. The comparator 10 is coupled to the sensing line SL1 to receive a voltage signal SV1 and compares the voltage signal SV1 with a reference voltage Vref. Similarly, the comparator 20 is coupled to the sensing line SL2 to receive a voltage signal SV2 and compares the voltage signal SV2 with the reference voltage Vref.

During detection of a press status of the keys SW1 to SW4, the driving line DL1 may be driven to a voltage level and the driving line DL2 may be driven to another voltage level. When the driving line DL1 is driven to said voltage level, the keys SW1 and SW2 transmit the corresponding voltage signals SV1 and SV2 to the comparators 10 and 20 respectively through the sensing lines SL1 and SL2 according to the press status. Then, the voltage signals SV1 and SV2 are respectively compared with the reference voltage Vref by the comparators 10 and 20 so as to determine the press status of the keys SW1 and SW2. Similarly, when the driving line DL2 is driven to said another voltage level, the keys SW3 and SW4 transmit the corresponding voltage signals SV1 and SV2 to the comparators 10 and 20 respectively through the sensing lines SL1 and SL2 according to the press status. Then, the voltage signals SV1 and SV2 are respectively compared with the reference voltage Vref by the comparators 10 and 20 so as to determine the press status of the keys SW3 and SW4.

It should be noted that, when a number of the sensing lines is increased due to increasing number of the keys in the keyboard apparatus, a number of the comparators to be coupled to the sensing lines for comparing the voltages must also be increased. However, errors may occur on the comparators due to drifts in the manufacturing process and result in misjudgment of the press status of the keys. Therefore, a calibration must be performed on each of the comparators in order to obtain an offset of each of the comparators, so that the press status of the corresponding key may be precisely detected. Aforesaid detection method for status of keys tends to consume more circuitry resources since the offset of each of the comparators must be stored.

On the other hand, it is also possible to adopt use of only one comparator that is precisely calibrated, so that this precisely calibrated comparator may sequentially perform comparison for the voltage signal on one of the sensing lines. Nonetheless, such detection method for status of keys is unable to concurrently and parallelly perform comparison on the voltage signals on all the sensing lines, and thus a detection speed thereof is relatively slower.

SUMMARY OF THE INVENTION

Accordingly, the invention is directed to a keyboard apparatus and a detection method of status of keys thereof, which are capable of precisely and rapidly determining press status of keys.

The keyboard apparatus of the invention includes a key module and a controller. The key module includes a plurality of keys, at least one first line and at least one second line. The at least one first line and the at least one second line are coupled to the keys to drive the keys or sense the keys. The controller is coupled to the at least one first line and the at least one second line. The controller parallelly drives the at least one first line to an identical potential and parallelly detects whether at least one key on the at least one second line is pressed as a first detection result in a first detection stage. The controller sequentially selects one of the at least one first line and parallelly scans a press status of each key on the selected first line through the at least one second line so as to generate a coarse scan result in a first scan stage. The controller obtains the press status of each of the keys and determines whether the press status of each of the keys is misjudged according to the first detection result and the coarse scan result in the first scan stage.

In an embodiment of the invention, the controller parallelly drives the at least one second line to an identical potential and parallelly detects whether at least one key on each of the at least one first line is pressed as a second detection result in a second detection stage. The controller replaces the first detection result by the second detection result, obtains the press status of each of the keys and determines whether the press status of each of the keys is misjudged according to the second detection result and the coarse scan result in the first scan stage.

In an embodiment of the invention, the controller obtains the press status of each of the keys and determines whether the press status of each of the keys is misjudged according to the first detection result, the second detection result and the coarse scan result in the first scan stage.

In an embodiment of the invention, the controller determines whether at least one of the keys is pressed according to the first detection result or the second detection result in the second detection stage and enters the first scan stage if a determination result is affirmative.

In an embodiment of the invention, the controller further determines whether the press status of each of the keys is misjudged according to the second detection result and a preset parameter in the first scan stage. The controller calculates for a count value according to the second detection result and determines that the press status of each of the keys is not misjudged when the count value is less than the preset parameter.

In an embodiment of the invention, the controller includes at least one first interface circuit, at least one second interface circuit, at least one first comparison circuit, a processing circuit and a driving circuit. The at least one first interface circuit is coupled to the at least one first line to drive or sense the at least one first line. The at least one second interface circuit is coupled to the at least one second line to drive or sense the at least one second line. The at least one first comparison circuit is coupled to the at least one second line. The processing circuit is coupled to the at least one first comparison circuit. The driving circuit is coupled to the at least one first interface circuit, the at least one second interface circuit and the processing circuit. The driving circuit parallelly drives the at least one first line to a first potential through the at least one first interface circuit and the at least one second interface circuit compares a voltage of the at least one second line with a reference voltage to generate the first detection result in the first detection stage. The driving circuit parallelly drives the at least one second line to the first potential through the at least one second interface circuit and the at least one first interface circuit compares a voltage of the at least one first line with the reference voltage to generate the second detection result in the second detection stage. In the first scan stage, the processing circuit sequentially selects the one of the at least one first line and drives the selected one of the at least one first line to the first potential and drives the rest of the at least one first line to a second potential through the driving circuit and the at least one first interface circuit, and the at least one first comparison circuit receives the voltage of the at least one second line to serve as at least one first scan voltage and compares the at least one first scan voltage with a comparison voltage to generate the coarse scan result.

In an embodiment of the invention, the controller further includes a second comparison circuit. The second comparison circuit is coupled to the at least one second line and the processing circuit. When the processing circuit determines that the press status of at least one of the keys is misjudged in the first scan stage, the processing circuit enters a second scan stage to drive the first line corresponding to the misjudged key to the first potential and drive the rest of the at least one first line to the second potential through the at least one first interface circuit and activates the second comparison circuit so that the second comparison circuit receives a voltage of the second line corresponding to the misjudged key to serve as a second scan voltage, and the second comparison circuit compares the second scan voltage with the comparison voltage to determine whether the misjudged key is pressed. The at least one first comparison circuit is a comparison circuit without calibration mechanism, and the second comparison circuit is a comparison circuit with calibration mechanism or an analog to digital converter with calibration mechanism.

In an embodiment of the invention, the processing circuit sequentially selects the one of the at least one first line according to the second detection result in the first scan stage. Herein, at least one key on the selected first line is pressed.

In an embodiment of the invention, whether the press status of the at least one key on each of the at least one second line is misjudged is related to a number of keys being pressed among the at least one key on each of the at least one second line.

The detection method for status of keys of the invention is adapted to a plurality of keys in a key module of a keyboard apparatus. The detection method of status of keys includes the following steps. In a first detection stage, at least one first line of the key module is parallelly driven to an identical potential and whether at least one key on each of at least one second line of the key module is pressed is parallelly detected as a first detection result. One of the at least one first line is sequentially selected and a press status of each key on the selected first line is parallelly scanned through the at least one second line so as to obtain a coarse scan result in a first scan stage. The press status of each of the keys is obtained and whether the press status of each of the keys is misjudged is determined according to the first detection result and the coarse scan result in the first scan stage.

Based on the above, the keyboard apparatus according to the invention is capable of performing two-stage detection operations in the detection mode. By driving the first lines (the driving lines) and the second lines (the sensing lines) alternately, information of the first lines (the driving lines) on which none of the keys is pressed and information of the second lines (the sensing lines) on which none of the keys is pressed may be learned, so that positions of the keys need not to be scanned may be skipped according to said information. In the scan mode, the parallelly comparison is performed through the first comparison circuit without calibration mechanism in order to obtain the coarse scan result and then the press status of each key is obtained and whether the press status of each key is misjudged is determined according to the first detection result, the second detection result and the coarse scan result in the first scan stage. After the position of the misjudged key is confirmed, the re-determination may then be performed for the misjudged key through the second comparison circuit with calibration mechanism in the second scan stage. Since the information (the first detection result and the second detection result) obtained in the detection mode may be used to solve the issue of inaccurate determination by the first comparison circuit without calibration mechanism and reduce the number of the keys need to be re-determined by the second comparison circuit with calibration mechanism, the scan speed of the keyboard apparatus may be improved while precisely determining whether each key is pressed.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A is a coarse scan result obtained in the first scan stage by the key module of FIG. 2 and FIG. 3.

FIG. 7B is another coarse scan result obtained in the first scan stage by the key module of FIG. 2 and FIG. 3.

DESCRIPTION OF THE EMBODIMENTS

Figure 1:
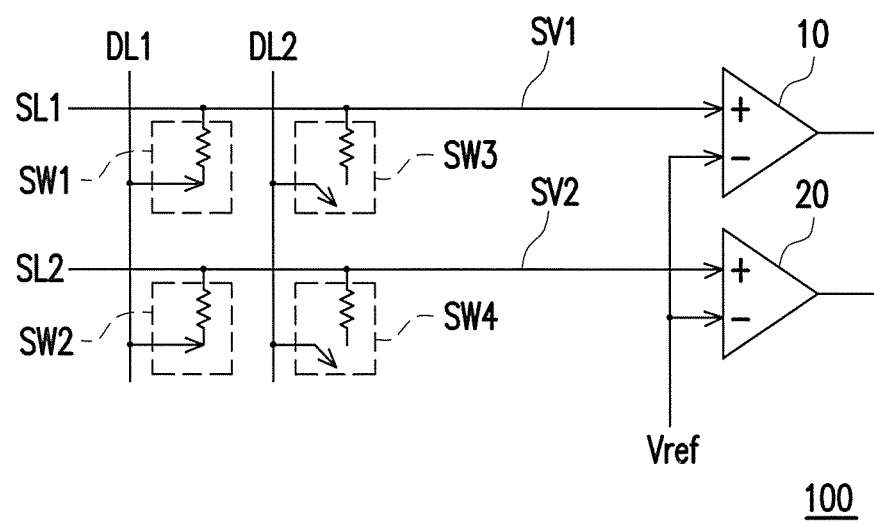
FIG. 1 is a schematic diagram of a conventional keyboard apparatus.

Reference will now be made in detail to the present preferred embodiments of the invention, examples of which are illustrated in the accompanying drawings. Wherever possible, the same reference numbers are used in the drawings and the description to refer to the same or like parts.

Figure 2:
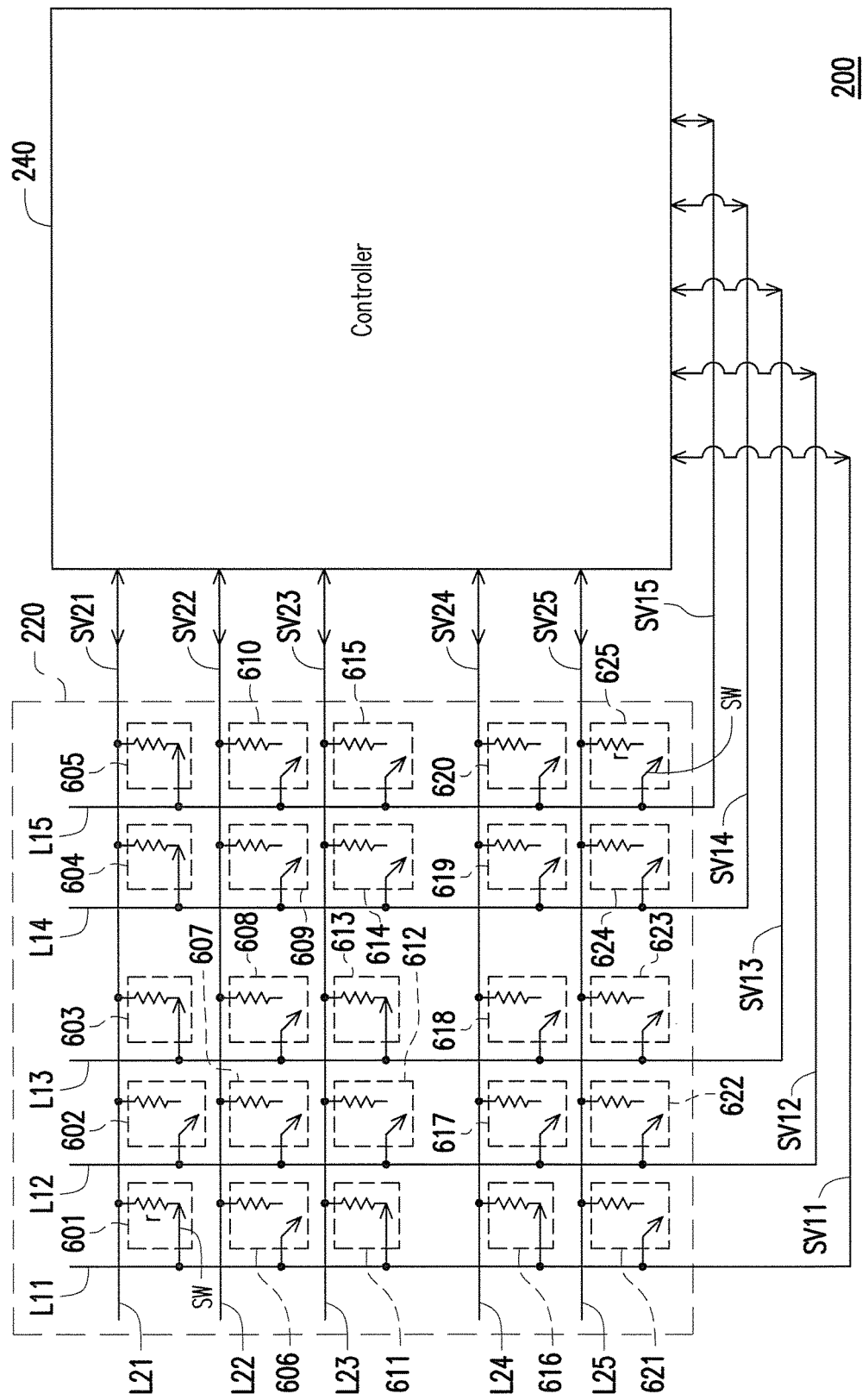
FIG. 2 is a schematic diagram of a keyboard apparatus according to an embodiment of the invention.

With reference to FIG. 2, FIG. 2 is a schematic diagram of a keyboard apparatus 200 according to an embodiment of the invention. The keyboard apparatus 200 may include a key module 220 and a controller 240. The key module 220 may include M×N keys, N first lines and M second lines, where M may be a positive integer greater than or equal to 1 and N may also be a positive integer greater than or equal to 1. For illustrative convenience, it is assumed herein that M and N are 5, and the exemplary embodiments having other values for M and N may be deduced with reference to the description set forth below. Accordingly, the key module 220 depicted in FIG. 2 includes twenty five keys 601 to 625, five first lines L11 to L15 and five second lines L21 to L25, where the keys 601, 603 to 605, 611, 613 and 616 are pressed. Each of the keys 601 to 625 includes a resistor r and a switch sw, where the resistor r and the switch sw are serially connected to each other. The switch sw of the key (e.g., the key 601) is turned on in response such key (the key 601) being pressed, and the switch sw of the key (e.g., the key 625) is turned off in response to such key (the key 625) not being pressed.

The first lines L11 to L15 and the second lines L21 to L25 are coupled to the keys 601 to 625 to drive the keys 601 to 625 or sense the keys 601 to 625. More specifically, the first line L11 is coupled to the keys 601, 606, 611, 616 and 621 to drive or sense the keys 601, 606, 611, 616 and 621. The rest of the first lines L12 to L15 may be deduced by analogy according to the content of FIG. 2. The second line L21 is coupled to the keys 601 to 605 to drive or sense the keys 601 to 605. The rest of the second lines L22 to L25 may be deduced by analogy according to the content of FIG. 2. In other words, the first lines L11 to L15 may be used as driving lines as well as sensing lines, depending on operational stages or steps of the keyboard apparatus 200. Similarly, the second lines L21 to L25 may also be used as the driving lines as well as the sensing lines, depending on operational stages or steps of the keyboard apparatus 200. Details regarding the above will be described later. The controller 240 is coupled to the first lines L11 to L15 and the second lines L21 to L25. The controller 240 is configured to detect a press status of each of the keys 601 to 625.

In an embodiment of the invention, the controller 240 is operable in a detection mode and a scan mode. In the detection mode, the controller 240 is capable of detecting whether any key among the keys 601 to 625 of the key module 220 is pressed. If the controller 240 determines that none of the keys 601 to 625 is pressed, the keyboard apparatus 200 stays in a sleep or idle status. By contrast, if the controller 240 determines that any key among the keys 601 to 625 is pressed, regardless of whether one key or multiple keys among the keys 601 to 625 are pressed, the controller 240 enters the scan mode. In the scan mode, the controller 240 scans each key among the keys 601 to 625 and compares a voltage of each of the sensing lines (e.g., the second lines L21 to L25) with a comparison voltage, so as to determine the press status of each key among the keys 601 to 625. Details regarding the above will be described later.

Figure 3:
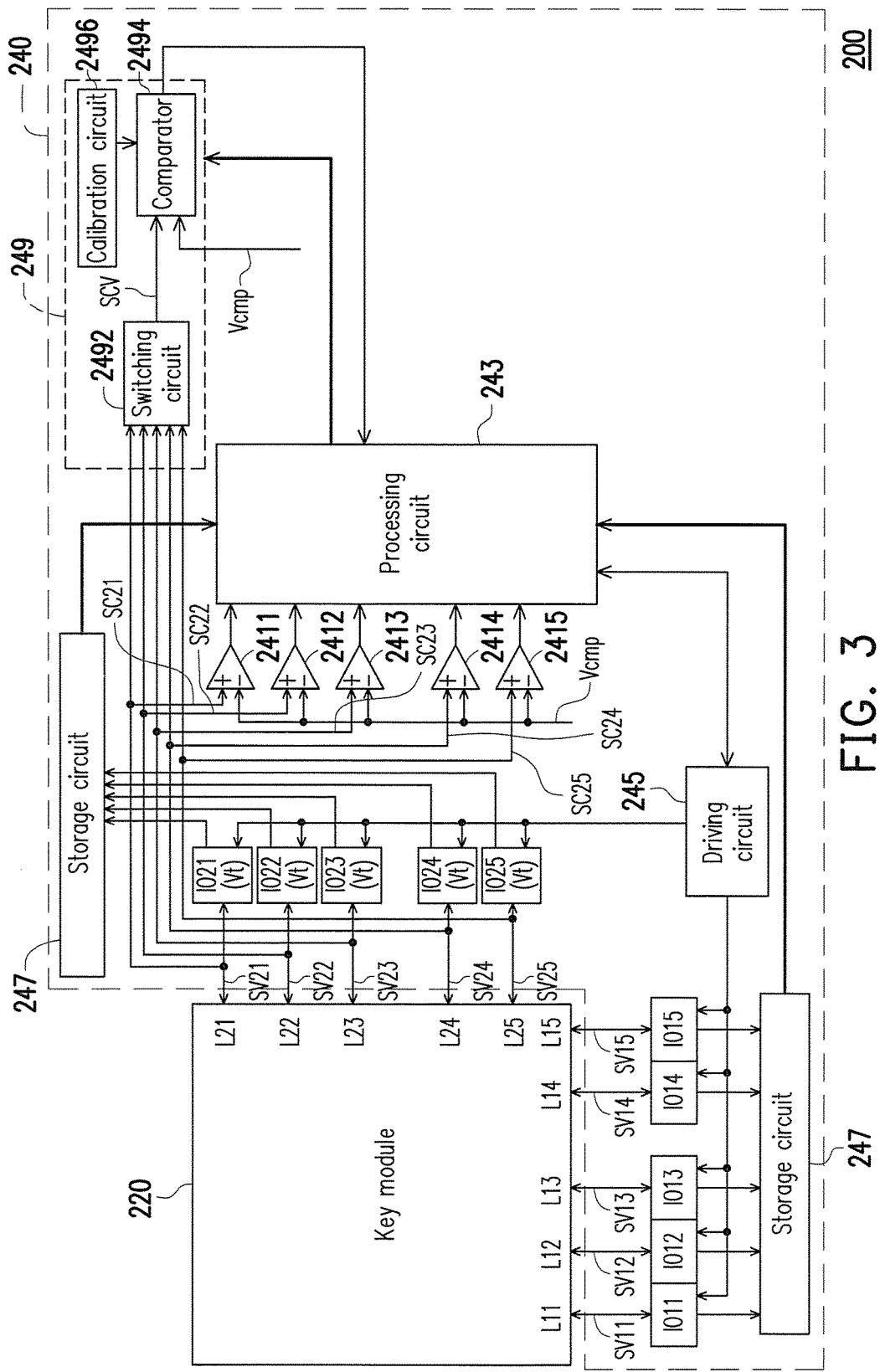
FIG. 3 is a block diagram illustrating circuitry of the keyboard apparatus of FIG. 2.

With reference to FIG. 3, FIG. 3 is a block diagram illustrating circuitry of the keyboard apparatus 200 of FIG. 2, in which the key module 220 of FIG. 3 may refer to the key module 220 depicted in FIG. 2. As depicted in FIG. 3, the controller 240 may include first interface circuits IO11 to IO15, second interface circuits IO21 to IO25, first comparison circuits 2411 to 2415, a processing circuit 243, a driving circuit 245 and a second comparison circuit 249, but not limited thereto. The first interface circuits IO11 to IO15 are respectively coupled to the first lines L11 to L15 to drive or sense the first lines L11 to L15. The second interface circuits IO21 to IO25 are respectively coupled to the second lines L21 to L25 to drive or sense the second lines L21 to L25.

The first comparison circuits 2411 to 2415 are respectively coupled to the second lines L21 to L25. The second comparison circuit 249 is coupled to the second lines L21 to L25. The processing circuit 243 is coupled to the first comparison circuits 2411 to 2415 and the second comparison circuit 249. The driving circuit 245 is coupled to the first interface circuits IO11 to IO15, the second interface circuits IO21 to IO25 and the processing circuit 243.

In an embodiment of the invention, the processing circuit 243 may be in form of hardware, firmware, or software or machine executable program codes stored in a memory and loaded and executed by a micro processor or a digital signal processor (DSP). In form of hardware, the processing circuit 243 may be implemented by a plurality of circuit chips or an integrated circuit chip. However, the invention is not limited thereto. The circuit chips or the integrated circuit chip may be implemented by adopting Application-Specific Integrated Circuit (ASIC) or Field Programmable Gate Array (FPGA). The memory may be, for example, compact disc, random access memory (RAM), read only memory (ROM), flash memory, floppy disc, hard drive, or Magneto-optical disc, and the like. Further, in an embodiment of the invention, the driving circuit 245 may also be implemented by adopting ASIC or FPGA.

Figure 4:
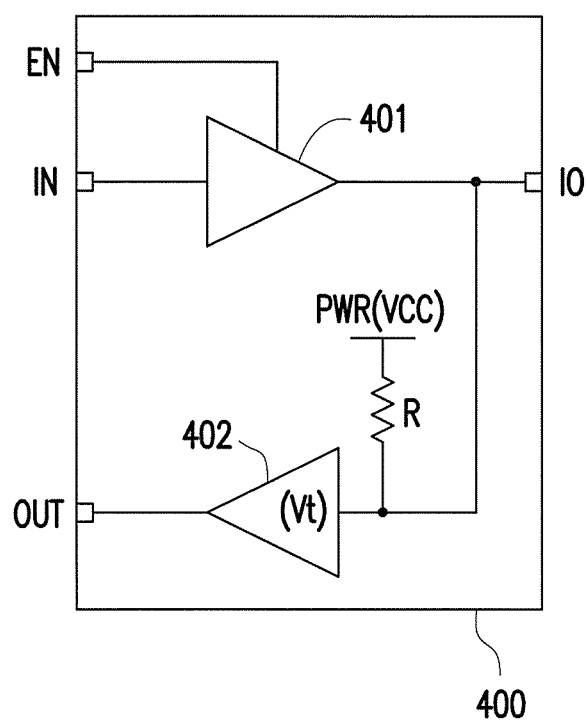
FIG. 4 is a schematic diagram illustrating a circuit scheme of a pad circuit or a general purpose input output circuit.

Furthermore, each of the first interface circuits IO11 to IO15 or each of the second interface circuits IO21 to IO25 may be implemented by adopting a pad circuit 400 (or a General Purpose Input Output (GPIO) circuit) as depicted in FIG. 4. However, the invention is not limited thereto.

The pad circuit 400 (or the GPIO circuit) depicted in FIG. 4 includes a first buffer 401, a second buffer 402 and a resistor R. An input terminal of the first buffer 401 is coupled to an input terminal IN of the pad circuit 400, an enable terminal of the first buffer 401 is coupled to an enable terminal EN of the pad circuit 400, and an output terminal of the first buffer 401 is coupled to an input/output terminal IO of the pad circuit 400. An input terminal of the second buffer 402 is coupled to the input/output terminal IO of the pad circuit 400, and an output terminal of the second buffer 402 is coupled to an output terminal OUT of the pad circuit 400. Herein, the second buffer 402 may be implemented by adopting a buffer with high threshold voltage or a Schmitt trigger with high threshold voltage, but the invention is not limited thereto. The resistor R is coupled between the input terminal of the second buffer 402 and a power terminal PWR. Herein, the power terminal PWR may be, for example, an operating power terminal of the controller 240, and a voltage level of the power terminal PWR may be, for example, a second potential VCC. However, the invention is not limited thereto.

Operations of the controller 240 in the detection mode are described as follows. Referring to FIG. 2 to FIG. 4 together, according to an embodiment of the invention, in the detection mode, the controller 240 is operable in a first detection stage and a second detection stage. Specifically, the controller 240 can parallelly drive the first lines L11 to L15 to an identical potential (e.g., 0V, but not limited thereto) and parallelly detect whether the keys on each of the second lines L21 to L25 are pressed as a first detection result in the first detection stage.

More specifically, as depicted in FIG. 3, the driving circuit 245 can parallelly drive the first lines L11 to L15 to a first potential (e.g., 0V, but not limited thereto) in the first detection stage through the first buffers (e.g., the first buffer 401 depicted in FIG. 4) in the first interface circuits IO11 to IO15, where the first potential is different from the second potential VCC. At this time, the first lines L11 to L15 are substantially the driving lines, and the second lines L21 to L25 are substantially the sensing lines. The keys 601 to 625 (as depicted in FIG. 2) in the key module 220 can transmit corresponding voltage signals SV21 to SV25 to the second interface circuits IO21 to IO25 through the second lines L21 to L25 according to the press status. The second interface circuits IO21 to IO25 can compare the voltage signals SV21 to SV25 on the second lines L21 to L25 with a reference voltage Vt respectively through the second buffers (e.g., the second buffer 402 depicted in FIG. 4) in the second interface circuits IO21 to IO25, so as to generate the first detection result. Herein, the reference voltage Vt may be a constant voltage built-in the second buffer 402 depicted in FIG. 4, and a voltage level of the reference voltage Vt is between the first potential and the second potential VCC. However, the invention is not limited thereto. In other embodiments of the invention, the voltage signals SV21 to SV25 (e.g., first scan voltages SC21 to SC25) may also be directly compared with a comparison voltage Vcmp by the first comparison circuits 2411 to 2415 to generate the first detection result. Herein, a voltage level of the comparison voltage Vcmp is between the first potential and the second potential VCC.

For instance, as depicted in FIG. 2, none of the five keys 621 to 625 on the second line L25 is pressed. Therefore, the second buffer (e.g., the second buffer 402 depicted in FIG. 4) of the second interface circuit IO25 (as depicted in FIG. 3) can receive the voltage signal SV25 whose potential is the second potential VCC through the resistor R and compare the voltage signal SV25 (the second potential VCC) with the reference voltage Vt, so as to generate the corresponding first detection result (e.g., logic 1). Alternatively, the first comparison circuit 2415 can receive the voltage signal SV25 whose potential is the second potential VCC through the resistor (the resistor R depicted in FIG. 4) in the second interface circuit IO25 to serve as the first scan voltage SC25. The first comparison circuit 2415 can compare the first scan voltage SC25 (the second potential VCC) with the comparison voltage Vcmp to generate the corresponding first detection result (e.g., logic 1).

In addition, since at least one key (i.e., the keys 601 and 603 to 605) among the five keys 601 to 605 on the second line L21 is pressed, a voltage dividing circuit is formed by the resistor (e.g., the resistor R depicted in FIG. 4) in the second interface circuit IO21 and the resistors r in the keys (i.e., the keys 601 and 603 to 605) pressed on the second line L21. If a resistance of the resistor (e.g., the resistor R depicted in FIG. 4) in the second interface circuit IO21 is far greater than a resistance of the resistor r, the voltage signal SV21 sensed by the second interface circuit IO21 is approximate to the first potential (e.g., 0V). The second buffer (e.g., the second buffer 402 depicted in FIG. 4) in the second interface circuit IO21 can compare the voltage signal SV21 (approximate to the first potential, e.g., 0V) with the reference voltage Vt to generate the corresponding first detection result (logic 0). Alternatively, the first comparison circuit 2411 can receive the voltage signal SV21 (approximate to the first potential, e.g., 0V) to serve as the first scan voltage SC21. The first comparison circuit 2411 can compare the first scan voltage SC21 (approximate to the first potential, e.g., 0V) with the comparison voltage Vcmp to generate the corresponding first detection result (e.g., logic 0).

Therefore, in which lines among the five second lines L21 to L25 is the at least one key pressed may be parallelly determined by the controller 240 in the first detection stage, and the detected first detection result may then be stored. For instance, since the four keys 601 and 603 to 605 on the second line L21 are pressed, the controller 240 can detect that at least one key among the keys 601 to 605 on the second line L21 is pressed in the first detection stage (however, which key among the keys 601 to 605 is pressed is still unknown to the controller 240). Since none of the five keys 621 to 625 on the second line L25 is pressed, the controller 240 can detect that none of the keys 621 to 625 on the second line L25 is pressed in the first detection stage.

In an embodiment of the invention, the controller 240 can determine whether at least one key among the keys 601 to 625 is pressed according to the first detection result in the first detection stage, and the controller 240 can enter the second detection stage if a determination result is affirmative.

The controller 240 can parallelly drive the second lines L21 to L25 to the identical potential (e.g., 0V, but not limited thereto) and parallelly detect whether the keys on each of the first lines L11 to L15 are pressed as a second detection result in the second detection stage.

More specifically, as depicted in FIG. 3, the driving circuit 245 can parallelly drive the second lines L21 to L25 to the first potential (e.g., 0V, but not limited thereto) in the second detection stage through the first buffers (e.g., the first buffer 401 depicted in FIG. 4) in the second interface circuits IO21 to IO25, where the first potential is different from the second potential VCC. At this time, the second lines L21 to L25 are substantially the driving lines, and the first lines L11 to L15 are substantially the sensing lines. The keys 601 to 625 (as depicted in FIG. 2) in the key module 220 can transmit corresponding voltage signals SV11 to SV15 to the first interface circuits IO11 to IO15 through the first lines L11 to L15 according to the press status. The first interface circuits IO11 to IO15 can compare the voltage signals SV11 to SV15 on the first lines L11 to L15 with the reference voltage Vt respectively through the second buffers (e.g., the second buffer 402 depicted in FIG. 4) in the first interface circuits IO11 to IO15, so as to generate the second detection result. Herein, the reference voltage Vt may be a constant voltage built-in the second buffer 402 depicted in FIG. 4.

For instance, as depicted in FIG. 2, none of the five keys 602, 607, 612, 617 and 622 on the first line L12 is pressed. The second buffer (e.g., the second buffer 402 depicted in FIG. 4) of the first interface circuit IO12 (as depicted in FIG. 3) can receive the voltage signal SV12 whose potential is the second potential VCC through the resistor R, and compare the voltage signal SV12 (the second potential VCC) with the reference voltage Vt to generate the corresponding second detection result (e.g., logic 1).

In addition, since at least one key (i.e., the keys 601, 611 and 616) among the five keys 601, 606, 611, 616 and 621 on the first line L11 is pressed, a voltage dividing circuit is formed by the resistor R depicted in FIG. 4) in the first interface circuit IO11 and the resistors r in the keys (i.e., the keys 601, 611 and 616) pressed on the first line L11. If a resistance of the resistor (e.g., the resistor R depicted in FIG. 4) in the first interface circuit IO11 is far greater than a resistance of the resistor r, the voltage signal SV11 sensed by the first interface circuit IO11 is approximate to the first potential (e.g., 0V). The second buffer (e.g., the second buffer 402 depicted in FIG. 4) in the first interface circuit IO11 can compare the voltage signal SV11 (approximate to the first potential, e.g., 0V) with the reference voltage Vt to generate the corresponding second detection result (logic 0).

Therefore, in which lines among the five first lines L11 to L15 is the at least one key pressed may be parallelly determined by the controller 240 in the second detection stage, and the detected second detection result may then be stored. For instance, since the three keys 601, 611 and 616 on the first line L11 are pressed, the controller 240 can detect that at least one key among the keys 601, 606, 611, 616 and 621 on the first line L11 is pressed in the second detection stage (however, which key among the keys 601, 606, 611, 616 and 621 is pressed is still unknown to the controller 240). Since none of the five keys 602, 607, 612, 617 and 622 on the second line L22 is pressed, the controller 240 can detect that none of the five keys 602, 607, 612, 617 and 622 on the second line L22 is pressed in the second detection stage.

Herein, it should be noted that, for the controller 240, operations of the first detection stage and operations of the second detection stage in the detection mode are interchangeable. In other words, the controller 240 may use the second lines L21 to L25 as the driving lines and the first lines L11 to L15 as the sensing lines in the first detection stage, and may use the first lines L11 to L15 as the driving lines and the second lines L21 to L25 as the sensing lines in the second detection stage. More specifically, the controller 240 can parallelly drive the second lines L21 to L25 to the identical potential (e.g., 0V, but not limited thereto) and parallelly detect whether the keys on each of the first lines L11 to L15 are pressed as the first detection result in the first detection stage. The controller 240 can determine whether at least one key among the keys 601 to 625 is pressed according to the first detection result in the first detection stage, and the controller 240 can enter the second detection stage if a determination result is affirmative. The controller 240 can parallelly drive the first lines L11 to L15 to an identical potential (e.g., 0V, but not limited thereto) and parallelly detect whether the keys on each of the second lines L21 to L25 are pressed as the second detection result in the second detection stage.

In an embodiment of the invention, the controller 240 may further include a storage circuit 247 (as depicted in FIG. 3). The storage circuit 247 is configured to store the first detection result and the second detection result, where the storage circuit 247 may be implemented by adopting a register or any type of memory. In addition, although two storage circuits 247 are illustrated in FIG. 3, the invention is not limited thereto. In other embodiments of the invention, one single storage circuit or multiple storage circuits may also be adopted to store the first detection result and the second detection result.

In an embodiment of the invention, in the second detection stage, the controller 240 can determine whether at least one key among the keys 601 to 625 is pressed according to the first detection result or the second detection result, and the controller 240 can activate the processing circuit 243 and enter the second detection stage if a determination result is affirmative. In an embodiment of the invention, in the scan mode, the controller 240 is operable in a first scan stage and a second scan stage. Operations of the controller 240 in the scan mode are described as follows.

Referring back to FIG. 2 to FIG. 4 together for the following description. As described above, the first lines L11 to L15 may be used as driving lines as well as sensing lines; and the second lines L21 to L25 may be used as driving lines as well as sensing lines. For illustrative convenience, hereinafter, it is assumed that the first lines L11 to L15 are the driving lines and the second lines L21 to L25 are the sensing lines. First, the controller 240 can adopt the first comparison circuits 2411 to 2415 to perform a voltage comparison and parallelly determine the press status of each of the keys 601 to 625 in the first scan stage. Herein, each of the first comparison circuits 2411 to 2415 may be a comparison circuit without calibration mechanism. The controller 240 enters the second scan stage only when the processing circuit 243 of the controller 240 is unable to determine the press status of at least one of the keys 601 to 625. The controller 240 may adopt the second comparison circuit 249 to perform the voltage comparison in the second scan stage so as to determine the press status of the key which cannot be determined among the keys 601 to 625. Herein, the second comparison circuit 249 is a comparison circuit with calibration mechanism or an analog to digital converter (ADC) with calibration mechanism, but not limited thereto. Operations of the controller 240 in the first scan stage are described as follows.

In the first scan stage, the controller 240 can sequentially select one (e.g., the first line L11) of the five first lines L11 to L15 and parallelly scan the press status of the five keys (the keys 601, 606, 611, 616 and 621) on the selected first line (the first line L11) through the five second lines L21 to L25 so as to generate a coarse scan result corresponding to the selected first line (the first line L11).

For instance, in the first scan stage, the controller 240 can select the first line L11 (but not limited thereto) first and scan the press status of the five keys 601, 606, 611, 616 and 621 on the first line L11 through the five second lines L21 to L25, so as to generate the coarse scan result corresponding to the first line L11. Next, the controller 240 can select the first line L12, and scan the press status of the five keys 602, 607, 612, 617 and 622 on the first line L12 through the five second lines L21 to L25, so as to generate the coarse scan result corresponding to the first line L12. The rest may be deduced by analogy.

Here, it is worth mentioning that, in an embodiment of the invention, the first line (e.g., the first line L11) selected by the controller 240 in the first scan stage may be the first line (e.g., the first line L11) having the at least one key being pressed as indicated by the second detection result. Since the controller 240 already correctly learns that none of the five keys 602, 607, 612, 617 and 622 of the first line L12 of FIG. 2 is pressed according to the second detection result, the controller 240 can skip the first line L12 in the first scan stage without scanning the press status of the five keys 602, 607, 612, 617 and 622 of the first line L12. As such, a number of scans in the first scan stage may be reduced to save the time for scanning.

Specifically, in the first scan stage, the processing circuit 243 in the controller 240 can select the first line L11 among the five first lines L11 to L15. The processing circuit 243 can drive the first line L11 to the first potential (e.g., 0V) through the driving circuit 245 and the first interface circuit IO11 and drive the rest of the first lines L12 to L15 to the second potential VCC through the driving circuit 245 and the first interface circuits IO12 to IO15. The first comparison circuits 2411 to 2415 can respectively receive the voltage signals SV21 to SV25 of the second lines L21 to L25 to serve as the first scan voltages SC21 to SC25. The first comparison circuits 2411 to 2415 can respectively compare the first scan voltages SC21 to SC25 with the comparison voltage Vcmp to generate the coarse scan result corresponding to the first line L11. Accordingly, the processing circuit 243 can obtain the press status of each of the keys 601, 606, 611, 616 and 621 on the first line L11.

Next, since the controller 240 learns that none of the five keys 602, 607, 612, 617 and 622 on the first line L12 is pressed according to the second detection result, the controller 240 can skip the first line L12 and select the first line L13 among the five first lines L11 to L15 in order to obtain the coarse scan result corresponding to the first line L13. Accordingly, the processing circuit 243 can obtain the press status of each of the keys 603, 608, 613, 618 and 623 on the first line L13. A method for obtaining the coarse scan result corresponding to the first line L13 is similar to a method for obtaining the coarse scan result corresponding to the first line L11 and thus may be deduced with reference to the method for obtaining the coarse scan result corresponding to the first line L11, which is not repeated hereinafter. Similarly, the rest of the first lines L14 and L15 may also be deduced with reference to the above description.

It should be noted that, it is possible that misjudgment may occur on the coarse scan result obtained in the first scan stage. Specifically, in the first scan stage, as a number of the keys being pressed among the keys 601 to 605 on the second line (the sensing line) L21 is increased, the voltage level of the voltage signal SV21 on the second line L21 is more approximate to the second potential VCC, such that the keys 601 to 605 on the second line L21 may be misjudged as not being pressed. Similarly, the same condition may also occur on the rest of the second lines (the sensing lines) L22 to L25.

Figure 5A:
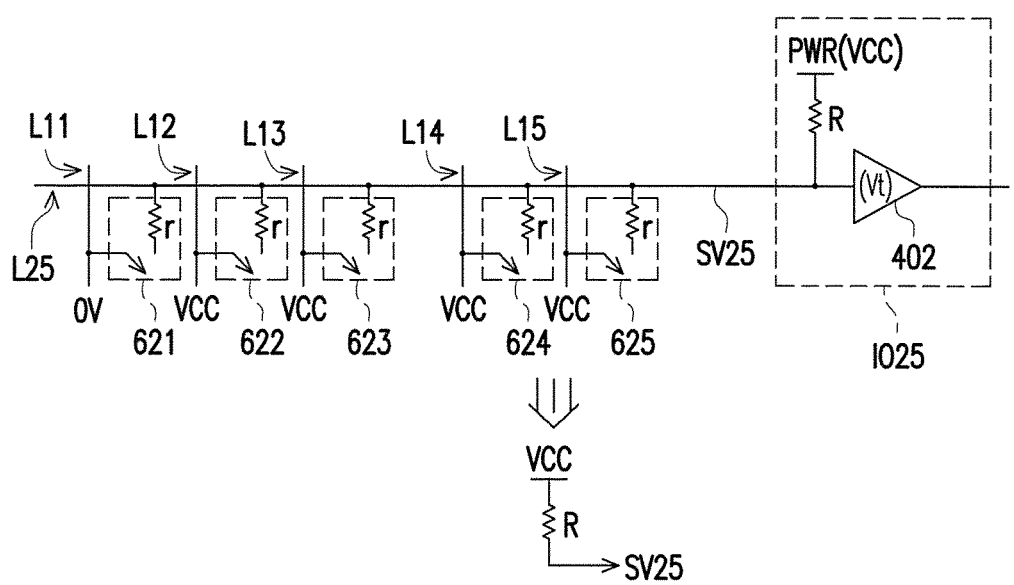
FIG. 5A to FIG. 5D are circuit diagrams illustrating a voltage dividing circuit formed by the keys of the second line and the second interface circuit according to embodiments of the invention.

For instance, with reference to FIG. 5A, FIG. 5A is a circuit diagram illustrating a voltage dividing circuit formed by the keys 621 to 625 on the second line L25 and the second interface circuit IO25. Herein, it is assumed that the first potential is 0V and the resistance of the resistor r of each of the keys 621 to 625 in FIG. 5A is far smaller than the resistance of the resistor R in the second interface circuit IO25. In the first scan stage, it is assumed that the first line (the driving line) L11 is selected so the first line (the driving line) L11 is driven to 0V (i.e., the first potential) and the rest of the first lines (the driving lines) L12 to L15 are driven to the second potential VCC. Because none of the keys on the second line L25 is pressed, a potential of the voltage signal SV25 on the second line (sensing line) L25 will be equal to the second potential VCC.

Figure 5B:
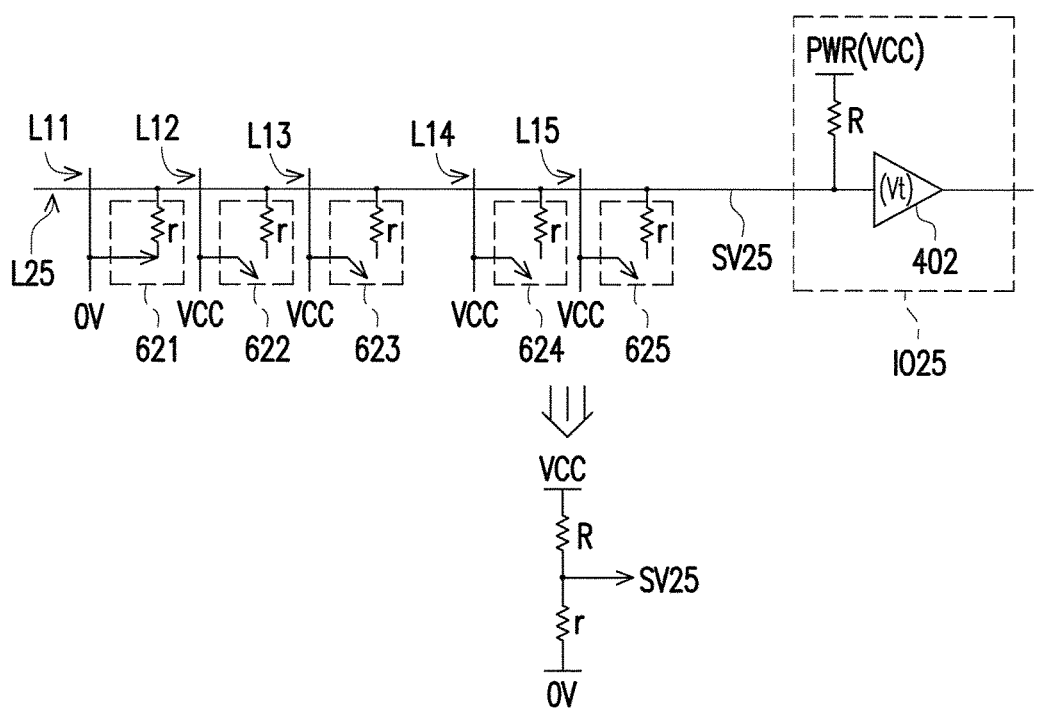

With reference to FIG. 5B, FIG. 5B is a circuit diagram illustrating another voltage dividing circuit formed by the keys 621 to 625 on the second line L25 and the second interface circuit IO25. As depicted in FIG. 5B, since the key 621 on the selected first line (the driving line) L11 is pressed while the keys 622 to 625 are not pressed, the potential of the voltage signal SV25 on the second line (the sensing line) L25 corresponding to the key 621 is VCC×(r÷(r+R)). Because the potential of the voltage signal SV25 is approximate to 0V (i.e., the first potential) since the resistance of the resistor r is far smaller than the resistance of the resistor R, it can be easily determined that the key 621 is pressed.

Figure 5C:
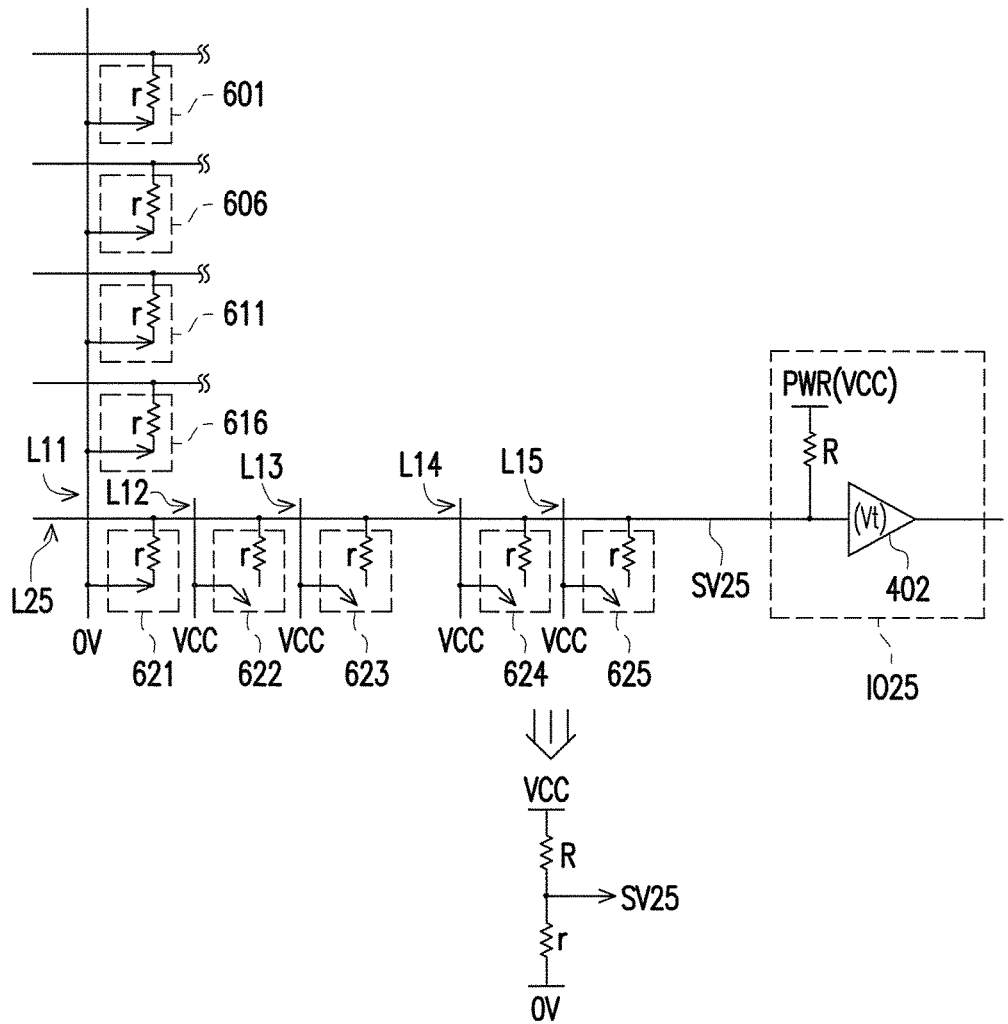

With reference to FIG. 5C, FIG. 5C is a circuit diagram illustrating yet another voltage dividing circuit formed by the keys 621 to 625 on the second line L25 and the second interface circuit IO25. As depicted in FIG. 5C, when all of the keys 601, 606, 611, 616 and 621 on the first line (the driving line) L11 are pressed while the keys 622 to 625 are not pressed, the potential of the voltage signal SV25 on the second line (the sensing line) L25 is still VCC×(r÷(r+R)). Because the potential of the voltage signal SV25 is approximate to 0V (i.e., the first potential) since the resistance of the resistor r is far smaller than the resistance of the resistor R, it can still be easily determined that the key 621 is pressed. In view of the above, it can be known that whether the key on the sensing line is pressed can still be easily determined even if multiple keys on the same driving line are pressed.

Figure 5D:
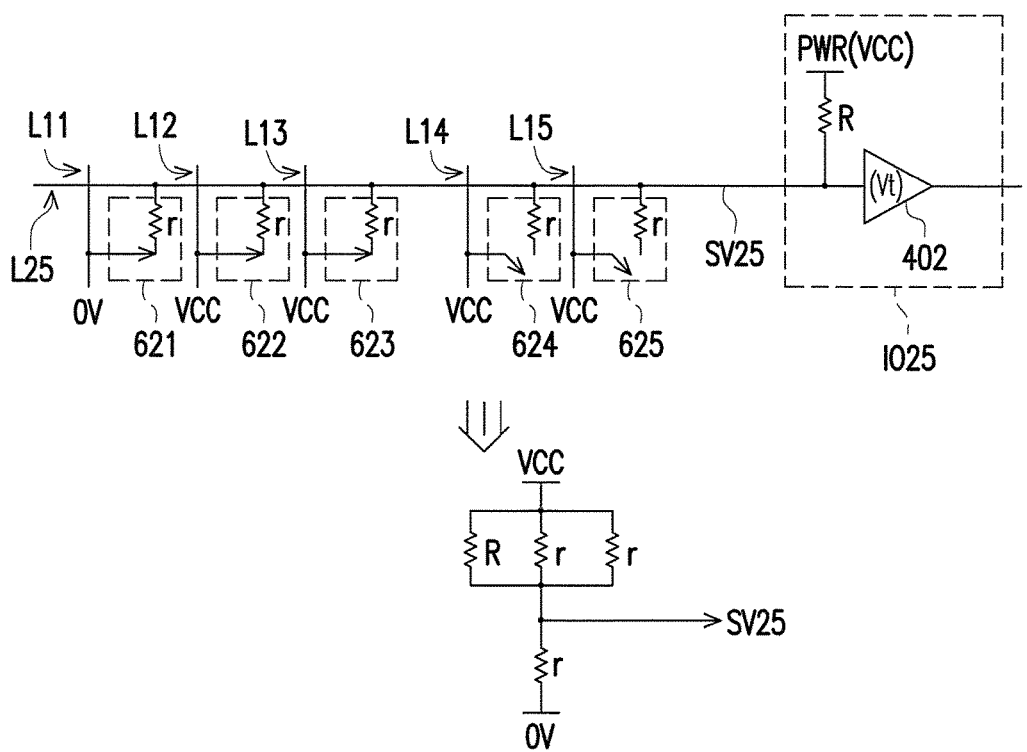

With reference to FIG. 5D, FIG. 5D is a circuit diagram illustrating yet another voltage dividing circuit formed by the keys 621 to 625 on the second line L25 and the second interface circuit IO25. When the first line (the driving line) L11 is selected and i keys (e.g., three keys, including the key 621) on the second line (the sensing line) L25 are pressed, the potential of the voltage signal SV25 on the second line (the sensing line) L25 is VCC×r/{[R∥(r/(i−1)]+r}=VCC×{1−1/[i+(r/R)]}, where i is a positive integer greater than 1 and less or equal to 5. As the value of i is greater, the potential of the voltage signal SV25 is more approximate to the second potential VCC, such that the first comparison circuit 2415 without calibration mechanism as depicted in FIG. 3 may misjudge the key 621 as not being pressed. Accordingly, it is difficult to determine whether the key 621 corresponding to the first line (the driving line) L11 and the second line (the sensing line) L25 is pressed or not pressed. Therefore, in the first scan stage, if the first comparison circuit 2415 without calibration mechanism is adopted to compare the voltage signal SV25 with the comparison voltage Vcmp in order to determine the press status of the key 621, the misjudgment may occur. It is worth mentioning that, for the first comparison circuit 2415 without calibration mechanism, the misjudgment occurs only under the circumstance where multiple keys on the second line (the sensing line) L25 are pressed but misjudged as none of those keys is pressed.

Figure 5E:
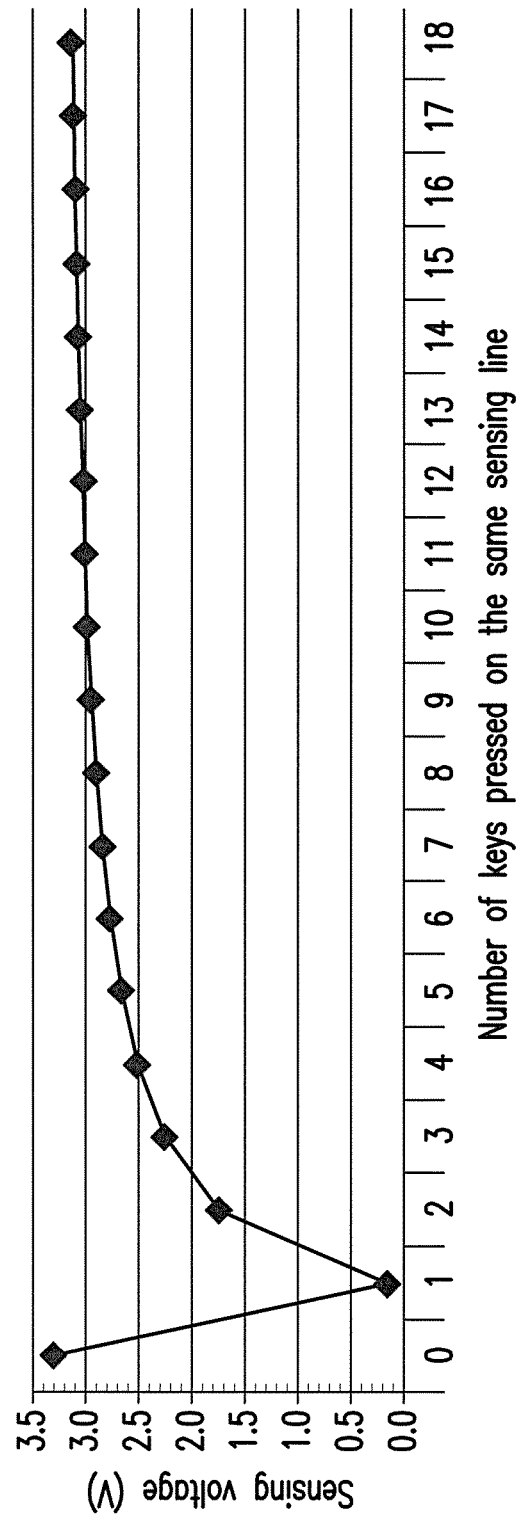
FIG. 5E is a schematic diagram illustrating relations of the number of the keys being pressed on one sensing line and the sensing voltages measured on such sensing line.

Table 1 lists sensing voltages practically measured on the corresponding sensing lines of another key module in the embodiment of the invention under different press scenarios. Herein, the first potential is 0V, the second potential VCC is 3.3V, and aforesaid key module includes eight sensing lines, eighteen driving lines and the corresponding one hundred and forty four keys. Further, each of the sensing lines includes eighteen keys and each of the driving lines includes eight keys. In addition, a resistor of each key among the one hundred and forty four keys is 3.6 kilo-ohm, and the resistor R of the pad circuit 400 (or the GPIO circuit) depicted in FIG. 4 is 75 kilo-ohm. FIG. 5E illustrates, under the circumstance where only the keys on one specific sensing line of aforesaid key module are pressed, a number of the keys being pressed on that specific sensing line and the sensing voltages correspondingly measured on the that specific sensing line. With reference to the content in Table 1 and the descriptions of FIG. 5A to FIG. 5E, it can be known that in the first scan stage, whether the press status of one specific key is misjudged is only related to the number of the keys being pressed on the sensing line where the specific key is located but unrelated to the number of keys being pressed on the driving line where the specific key is located.

TABLE 1

| Press scenario | Sensing voltage (V) on the corresponding sensing line |
| --- | --- |
| None of the keys is pressed | 3.30 |
| One of the keys is pressed | 0.16 |
| Eight keys on the same driving line are simultaneously pressed | 0.16 |
| Eighteen keys on the same sensing line are simultaneously pressed | 3.12 |
| All one hundred and forty four keys are simultaneously pressed | 3.12 |

Hereinafter, referring back to FIG. 2 to FIG. 4, the controller 240 can obtain the press status of each of the keys 601 to 625 and determines whether the press status of each of the keys 601 to 625 is misjudged (or the press status cannot be correctly identified) according to the first detection result, the second detection result and the coarse scan result in the first scan stage.

More specifically, as described above, the controller 240 can correctly learn the lines among the second lines L21 to L25 in which the keys not being pressed at all according to the first detection result to obtain the not pressed second line and can correctly learn the lines among the first line L11 to L15 in which the keys are not pressed at all according to the second detection result to obtain the not pressed first line. In other words, it can be correctly learned that all keys on the not pressed second line are not pressed according to the first detection result, and it can be correctly learned that all keys on the not pressed first line are not pressed according to the second detection result. Further, the determination result for the keys determined as being pressed are also correct in the coarse scan result because the first comparison circuits 2411 to 2415 without calibration mechanism may only misjudge the keys practically pressed as not being pressed. Therefore, among the keys 601 to 625, the rest of keys excluding those having the press status that can be correctly determined may still be misjudged by the first comparison circuits 2411 to 2415, and thus it is required to re-determine the press status of the rest of the keys through the second comparison circuit 249 with calibration mechanism.

Figure 6:
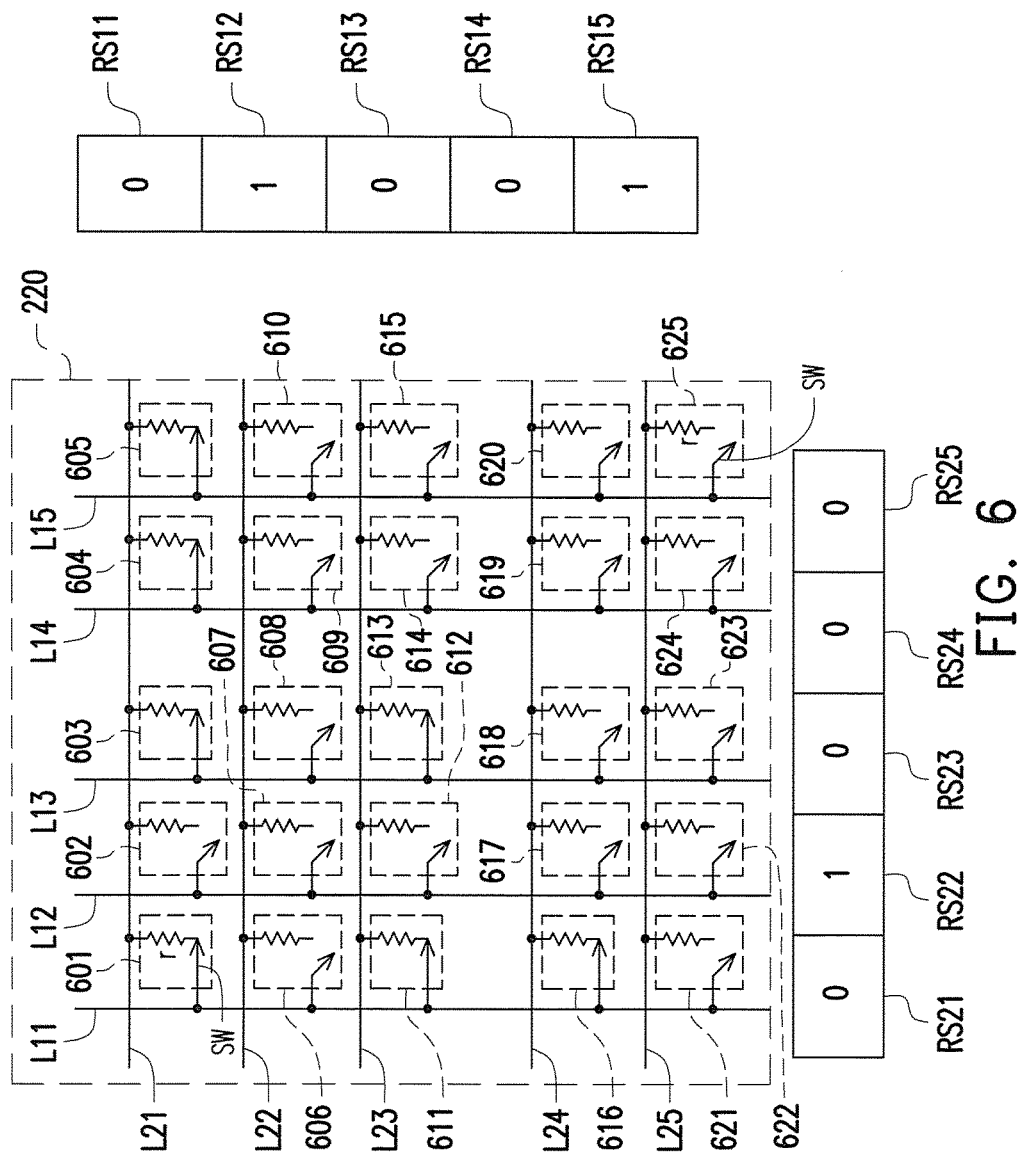
FIG. 6 is a schematic diagram of first detection results and second detection results respectively obtained in the first detection stage and the second detection stage by the key module of FIG. 2 and FIG. 3.

For instance, hereinafter, referring to FIG. 2, FIG. 3 and FIG. 6 together, FIG. 6 is a schematic diagram of first detection results RS11 to RS15 and second detection results RS21 to RS25 respectively obtained in the first detection stage and the second detection stage by the key module 220 of FIG. 2 and FIG. 3. Since the four keys 601 and 603 to 605 on the second line L21 are pressed, in the first detection stage, the first detection result RS11 indicating that at least one of the keys 601 to 605 on the second line L21 is pressed may be obtained and represented by logic 0, but the invention is not limited thereto. The rest of the second lines L22 to L25 may also be deduced by analogy, and thus related description thereof is omitted hereinafter. Since none the five keys 602, 607, 612, 617 and 622 on the first line L12 is pressed, in the second detection stage, the second detection result RS22 indicating that none of the keys 602, 607, 612, 617 and 622 on the first line L12 is pressed may be obtained and represented by logic 1, but the invention is not limited thereto. The rest of the first lines L11 and L13 to L15 may also be deduced by analogy, and thus related description thereof is omitted hereinafter.

After entering the first scan stage, the controller 240 can select the first line L11 to drive the first line L11 to the first potential (e.g., 0V) and drive the rest of the first lines L12 to L15 to the second potential VCC (e.g., 3.3V). Next, the first scan voltages SC21 to SC25 from the second lines (the sensing lines) L21 to L25 are respectively compared with the comparison voltage Vcmp through the first comparison circuits 2411 to 2415 not being calibrated in the controller 240, and the press status of each of the five keys 601, 606, 611, 616 and 621 on the first line (the driving line) L11 is parallelly determined.

Herein, it is assumed that when at least three keys on one specific second line (sensing line) are simultaneously pressed, the keys on the specific second line may be misjudged as not being pressed. Since the voltage on the second line (sensing line) L21 is very close to the second potential VCC (e.g., 3.3V) due to the four keys 601 and 603 to 605 on the second line (sensing line) L21 being simultaneously pressed, the first comparison circuit 2411 without calibration mechanism misjudges the press status of the key 601 as not being pressed and obtains a coarse scan result R01 of logic 1 (merely an example), as depicted in FIG. 7A.

Since the voltage on the second line (the sensing line) L22 is the second potential VCC (e.g., 3.3V) due to the key 606 not being pressed, the first comparison circuit 2412 without calibration mechanism can determine the press status of the key 606 as not being pressed and obtain a coarse scan result R06 of logic 1 (merely an example), as depicted in FIG. 7A.

Since only the two keys 611 and 613 on the second line (the sensing line) L23 are simultaneously pressed, the first comparison circuit 2413 without calibration mechanism can still correctly determine the press status of the key 611 as being pressed and obtain a coarse scan result R11 of logic 0 (merely an example). Similarly, since only the key 616 on the second line (the sensing line) L24 is pressed, the first comparison circuit 2414 may still correctly determine the press status of the key 616 as being pressed and obtain a coarse scan result R16 of logic 0 (merely an example), as depicted in FIG. 7A.

Since the voltage on the second line (the sensing line) L25 is the second potential VCC (e.g., 3.3V) due to the key 621 not being pressed, the first comparison circuit 2415 without calibration mechanism can determine the press status of the key 621 as not being pressed and obtain a coarse scan result R21 of logic 1 (merely an example), as depicted in FIG. 7A.

Next, the controller 240 can learn that none of the keys on the first line (the driving line) L12 is pressed according to the second detection results RS21 to RS25 of FIG. 6. Therefore, the controller 240 can skip the first line (the driving line) L12 and select the first line (the driving line) L13, so as to drive the first line (the driving line) L13 to the first potential (e.g., 0V) and drive the rest of the first lines (the driving lines) L11, L12, L14 and L15 to the second potential VCC (e.g., 3.3V). The controller 240 may determine the press status of the five keys 603, 608, 613, 618 and 623 on the first line (the driving line) L13 with reference to related description for determining the press status of the five keys 601, 606, 611, 616 and 621 on the first line (the driving line) L11, which is not repeated hereinafter. Similarly, the rest of the first lines (the driving lines) L14 and L15 may obtain the coarse scan results R01 to R25 (as depicted in FIG. 7A) corresponding to the keys 601 to 625 of FIG. 6 by the same method.

As described above, in the first scan stage, only the key (e.g., the key 601) practically being pressed may be misjudged as not being pressed. Therefore, without the help of the first detection results RS11 to RS15 and the second detection results RS21 to RS25, the controller 240 is only able to determine that the three keys 611, 613 and 616 corresponding to the coarse scan result of logic 0 are indeed being pressed according to the coarse scan results R01 to R25 from FIG. 7A but unable to ensure that the rest of twenty two keys 601 to 610, 612, 614, 615 and 617 to 625 corresponding to the coarse scan result of logic 1 are indeed not being pressed. In other words, the keys 601 to 610, 612, 614, 615 and 617 to 625 may be misjudged as not being pressed. Hence, the controller 240 can determine that the press status of the keys 601 to 610, 612, 614, 615 and 617 to 625 cannot be identified according to the coarse scan results R01 to R25, such that the press status of the twenty two keys 601 to 610, 612, 614, 615 and 617 to 625 must be re-determined in sequence by adopting the second comparison circuit 249 with calibration mechanism in the second scan stage.

On the other hand, in the first scan stage, with the help of the second detection results RS21 to RS25, the controller 240 can learn that none of the keys on the first line (the driving line) L12 is pressed according to the second detection results RS21 to RS25, so as to ensure that the five keys 602, 607, 612, 617 and 622 on the first line (the driving line) L12 corresponding to the coarse scan result of logic 1 are indeed not being pressed. Furthermore, the controller 240 can determine that the three keys 611, 613 and 616 corresponding to the coarse scan result of logic 0 are indeed being pressed according to the coarse scan results R01 to R25 depicted in FIG. 7A. Accordingly, what is to be ensured by the controller 240 now is whether the rest of seventeen keys 601, 603 to 606, 608 to 610, 614, 615, 618 to 621 and 623 to 625 corresponding to the coarse scan result of logic 1 are indeed not being pressed. In other words, at this time, only the seventeen keys 601, 603 to 606, 608 to 610, 614, 615, 618 to 621 and 623 to 625 may be misjudged as not being pressed. Hence, the controller 240 can determine that the press status of the seventeen keys 601, 603 to 606, 608 to 610, 614, 615, 618 to 621 and 623 to 625 cannot be correctly identified according to the coarse scan results R01 to R25 and the second detection results RS21 to RS25, such that the press status of the seventeen keys 601, 603 to 606, 608 to 610, 614, 615, 618 to 621 and 623 to 625 must be re-determined in sequence by adopting the second comparison circuit 249 with calibration mechanism in the second scan stage.

In the first scan stage, with the help of the first detection result RS11 to RS15, the controller 240 can learn that none of the keys on the second lines (the sensing lines) L22 and L25 is pressed according to the first detection results RS11 to RS15 of FIG. 6, so as to ensure that the five keys 606 to 610 of the second line (the sensing line) L22 and the five keys 620 to 625 of the second line (sensing line) L25 corresponding to the coarse scan result of logic 1 are indeed not being pressed. Furthermore, the controller 240 can determine that the three keys 611, 613 and 616 corresponding to the coarse scan result of logic 0 are indeed being pressed according to the coarse scan results R01 to R25 depicted in FIG. 7A. Accordingly, what is to be ensured by the controller 240 now is whether the rest of twelve keys 601 to 605, 612, 614, 615, and 617 to 620 corresponding to the coarse scan result of logic 1 are indeed not being pressed. In other words, at this time, only the twelve keys 601 to 605, 612, 614, 615 and 617 to 620 may be misjudged as not being pressed. Hence, the controller 240 can determine that the press status of the twelve keys 601 to 605, 612, 614, 615 and 617 to 620 cannot be correctly identified according to the coarse scan results R01 to R25 and the first detection results RS11 to RS15, such that the press status of the twelve keys 601 to 605, 612, 614, 615 and 617 to 620 must be re-determined in sequence by adopting the second comparison circuit 249 with calibration mechanism in the second scan stage.

In the first scan stage, with the help of the first detection result RS11 to RS15 and the second detection result RS21 to RS25, the controller 240 can learn that none of the keys on the second lines (the sensing lines) L22 and L25 and the first line (the driving line) L12 is pressed according to the first detection results RS11 to RS15 and the second detection results RS21 to RS25 of FIG. 6, so as to ensure that thirteen keys 602, 606 to 610, 612, 617 and 621 to 625 on the second lines (the sensing lines) L22 and L25 and the first line (the driving line) L12 corresponding to the coarse scan result of logic 1 are indeed not being pressed. Furthermore, the controller 240 can determine that the three keys 611, 613 and 616 corresponding to the coarse scan result of logic 0 are indeed being pressed according to the coarse scan results R01 to R25 depicted in FIG. 7A. Accordingly, what is to be ensured by the controller 240 now is whether the rest of nine keys 601, 603 to 605, 614, 615 and 618 to 620 are indeed not being pressed. In other words, at this time, only the nine keys 601, 603 to 605, 614, 615 and 618 to 620 may be misjudged as not being pressed. Hence, the controller 240 can determine that the press status of the nine keys 601, 603 to 605, 614, 615 and 618 to 620 cannot be correctly identified according to the coarse scan results R01 to R25, the first detection results RS11 to RS15 and the second detection results RS21 to RS25, such that the press status of the nine keys 601, 603 to 605, 614, 615 and 618 to 620 must be re-determined in sequence by adopting the second comparison circuit 249 with calibration mechanism in the second scan stage.

In view of the above, it can be known that, with the help of the first detection results RS11 to RS15 and the second detection results RS21 to RS25, a number of the keys corresponding to the press status that must be determined by the second comparison circuit 249 with calibration mechanism is reduced from twenty two to nine. Therefore, with the help of the first detection results RS11 to RS15, the second detection results RS21 to RS25 and the second comparison circuit 249 with calibration mechanism, in addition to improved scan speed of the keyboard apparatus 200, whether each of the keys 601 to 625 is pressed may also be precisely determined.

More specifically, as described above, in the first scan stage, whether the press status of the key (e.g., the key 601) is misjudged is only related to a number of the keys being pressed on the second line (the sensing line, e.g., the second line L21) where the key (e.g., the key 601) is located. Therefore, in an embodiment of the invention, if the processing circuit 243 is able to learn in advance that the misjudgment caused by the first comparison circuit without calibration mechanism (e.g., the first comparison circuit 2411) will only occur when the number of the keys being simultaneously pressed on the same second line (the sensing line, e.g., the second line L21) is greater than K keys, a preset parameter value K may be defined accordingly. Accordingly, the controller 240 of FIG. 3 can further determine whether the press status of each of the keys 601 to 625 is misjudged according to the second detection results RS21 to RS25 and the preset parameter K in the first scan stage. Specifically, the controller 240 can calculate for a count value according to the second detection results RS21 to RS25, where the count value is a number of the first lines having the key being pressed. When the count value is less than the preset parameter K, the controller 240 can determine that the press status of each of the keys 601 to 625 is not misjudged, that is, the coarse scan results R01 to R25 are correct.

For instance, in the embodiment depicted in FIG. 6, what illustrated in FIG. 7A are the coarse scan results R01 to R25 corresponding to the preset parameter being 3. According to the second detection results RS21 to RS25 depicted in FIG. 6, the count value may be calculated to be 4 (i.e., a number of logic 0). Since the count value (being 4) is greater than the preset parameter K (being 3), it can be known that the coarse scan results R01 to R25 depicted in FIG. 7A may be misjudged, such that whether the nine keys 601, 603 to 605, 614, 615 and 618 to 620 are pressed must be re-determined through the second comparison circuit 249 with calibration mechanism.

By contrast, if the preset parameter K is 5 (i.e., the processing circuit 243 learned in advance that the misjudgment caused by the first comparison circuit without calibration mechanism (e.g., the first comparison circuit 2411) only occurs when the number of the keys being simultaneously pressed on the same second line (the sensing line, e.g., the second line L21) is greater than 5), the coarse scan results R01 to R25 as depicted in FIG. 7B may be obtained accordingly. Because the count value (being 4) obtained from the second detection results RS21 to RS25 depicted in FIG. 6 is less than the preset parameter K (being 5), it can be known that the coarse scan results R01 to R25 depicted in FIG. 7B are correct. In view of the above, it can be known that even if only the first comparison circuits 2411 to 2415 without calibration mechanism are adopted, whether each of the keys 601 to 625 is pressed may still be correctly determined without further determination through the second comparison circuit 249 with calibration mechanism.

In conclusion, only the keys satisfying all the following three conditions must be re-determined through the second comparison circuit 249 with calibration mechanism for re-determining whether said keys are pressed. (1) The key indicated by both of the first detection result (RS11 to RS15) and the second detection result (RS21 to RS25) as being pressed. Take the embodiments of FIG. 6 and FIG. 7A for example, the keys 601, 603 to 605, 611, 613 to 615, 616 and 618 to 620 satisfy this condition. (2) The key indicated by the coarse scan result (R01 to R25) as not being pressed. Take the embodiments of FIG. 6 and FIG. 7A for example, the keys 601 to 610, 612, 614, 615 and 617 to 625 satisfy this condition. (3) The count value obtained from the second detection results RS21 to RS25 is greater than the preset parameter K. Take the embodiments of FIG. 6 and FIG. 7A for example, this condition is satisfied when the count value 4 obtained from the second detection results RS21 to RS25 is greater than the preset parameter K (being 3). Nine of the keys satisfy all three conditions above, which are the keys 601, 603 to 605, 614, 615 and 618 to 620. Therefore, whether said nine keys 601, 603 to 605, 614, 615 and 618 to 620 are pressed must be re-determined in sequence through the second comparison circuit 249 with calibration mechanism. Operations of the second scan stage are described as follows.

The following description refers to FIG. 2, FIG. 3, FIG. 6 and FIG. 7A together. Since the processing circuit 243 determines that said nine keys 601, 603 to 605, 614, 615 and 618 to 620 may be misjudged (i.e., the press status of the keys 601, 603 to 605, 614, 615 and 618 to 620 cannot be ensured), the processing circuit 243 can enter the second scan stage. The processing circuit 243 can drive the first line L11 corresponding to the key 601 to the first potential (e.g., 0V) and drive the rest of the first lines L12 to L15 to the second potential VCC through the first interface circuits IO11 to IO15. The processing circuit 243 can activate the second comparison circuit 249 with calibration mechanism so that the second comparison circuit 249 receives a voltage of the second line L21 corresponding to the key 601 to serve as a second scan voltage SCV. The second comparison circuit 249 can compare the second scan voltage SCV with the comparison voltage Vcmp in order to precisely determine whether the key 601 is pressed. Similarly, in the second scan stage, a method for determining the press status of each of the keys 603 to 605, 614, 615 and 618 to 620 may also be deuced from the above description, which is not repeated hereinafter.

In an embodiment of the invention, as depicted in FIG. 3, the second comparison circuit 249 includes a switching circuit 2492, a comparator 2494 and a calibration circuit 2496. The switching circuit 2492 is coupled to the second lines L21 to L25 to receive the voltage signals SV21 to SV25 and select a corresponding one of the voltage signals SV21 to SV25 to serve as the second scan voltage SCV. The calibration circuit 2496 is coupled to the comparator 2494 to perform an error calibration for the comparator 2494. The comparator 2494 can compare the second scan voltage SCV with the comparison voltage Vcmp in order to output a precise comparison result.

Figure 8:
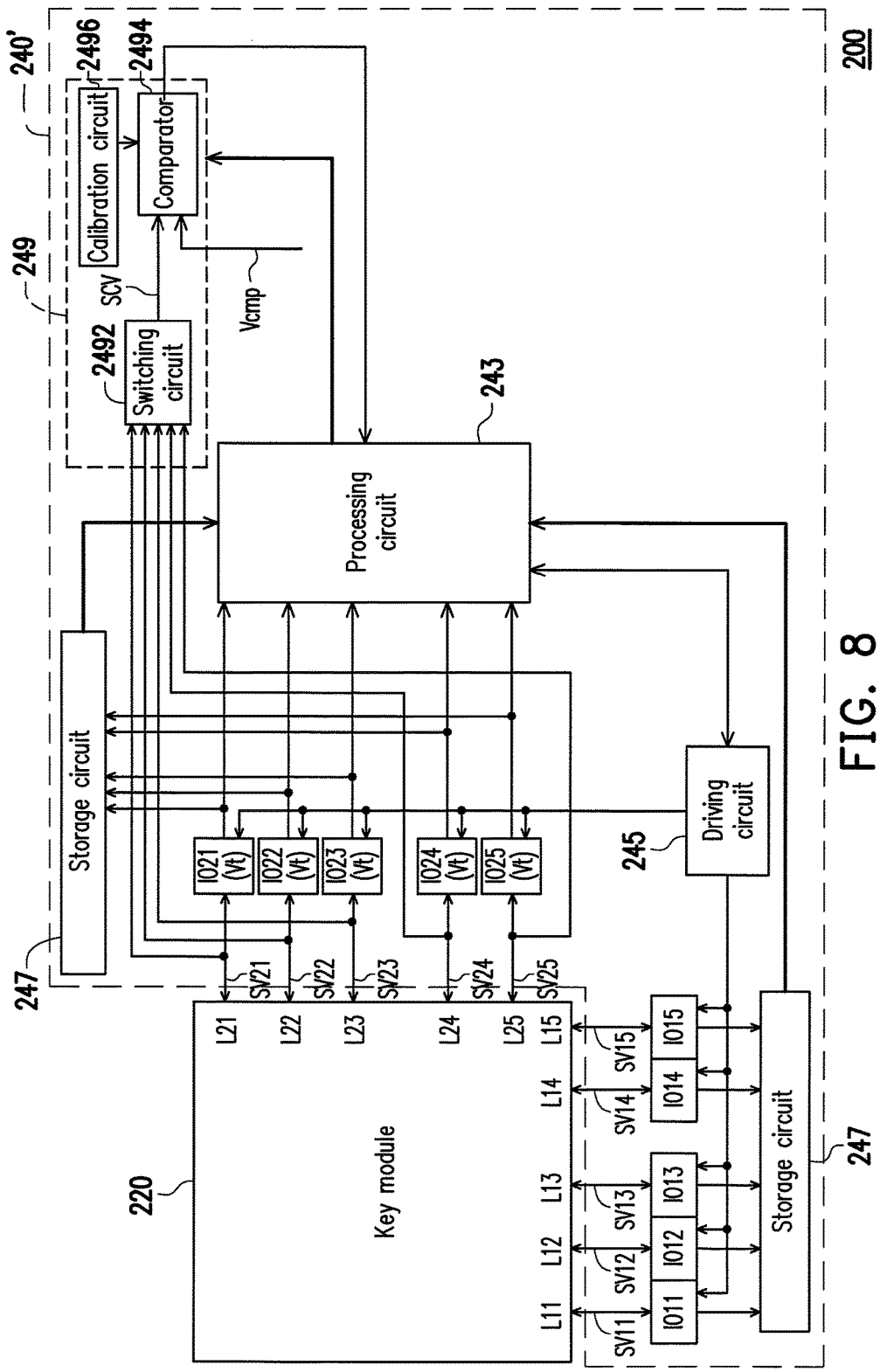
FIG. 8 is another block diagram illustrating circuitry of the keyboard apparatus of FIG. 2.

The following refers back to FIG. 3. As described above, in the first scan stage, the processing circuit 243 can select one of the five first lines L11 to L15. The first comparison circuits 2411 to 2415 can respectively receive the voltage signals SV21 to SV25 of the second lines L21 to L25 to serve as the first scan voltages SC21 to SC25. The first comparison circuits 2411 to 2415 can respectively compare the first scan voltage SC21 to SC25 with the comparison voltage Vcmp to generate the coarse scan result corresponding to the selected one of the first lines L11 to L15. However, the invention is not limited to the above. Since the second interface circuits IO21 to IO25 also include functions of the voltage comparison, in another embodiment of the invention, functions of the first comparison circuits 2411 to 2415 may also be replaced by the functions of the second interface circuits IO21 to IO25. Accordingly, the first comparison circuits 2411 to 2415 of FIG. 3 may be omitted so that circuit costs of the controller 240 may be reduced, as shown by a controller 240' in FIG. 8.

Figure 9:
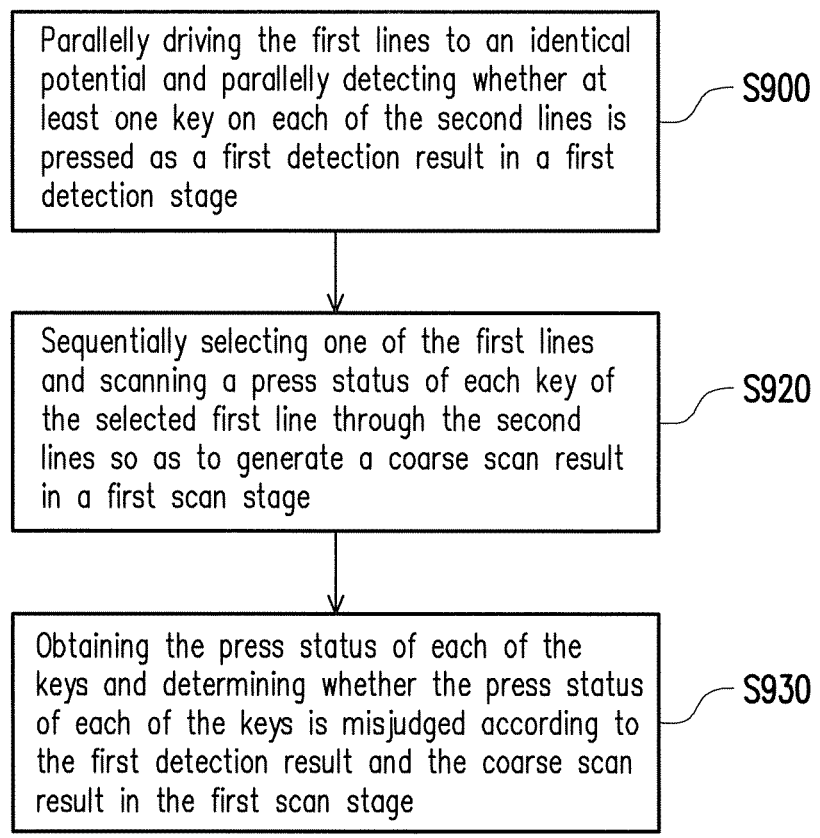
FIG. 9 is a flowchart illustrating steps in the detection method for status of keys according to an embodiment of the invention.

FIG. 9 is a flowchart illustrating steps in the detection method for status of keys according to an embodiment of the invention. Referring to FIG. 2, FIG. 3 and FIG. 9 together, a detection method for status of keys of the keyboard apparatus according to the present exemplary embodiment includes the following steps. First, in step S900, the first lines L11 to L15 are parallelly driven to an identical potential and whether at least one key on each of the second lines L21 to L25 is pressed is parallelly detected as a first detection result in a first detection stage. Next, in step S920, one of the first lines L11 to L15 (e.g., the first line L11) is sequentially selected and a press status of each key (e.g., each of the keys 601, 606, 611, 616 and 621) of the selected first line (e.g., the first line L11) is scanned through the second lines L21 to L25 so as to generate a coarse scan result in a first scan stage. Lastly, in step S930, the press status of each of the keys 601 to 625 is obtained and whether the press status of each of the keys 601 to 625 is misjudged is determined according to the first detection result and the coarse scan result in the first scan stage.

In addition, sufficient teaching, suggestion, and implementation illustration regarding the detection method for status of keys of the keyboard apparatus according the embodiment of the invention may be obtained from the descriptions for FIG. 1 to FIG. 8, which are not repeated hereinafter.

In summary, the keyboard apparatus according to the embodiments of the invention is capable of performing two-stage detection operations in the detection mode. By driving the first lines (the driving lines) and the second lines (the sensing lines) alternately, information (i.e., the first detection result and the second detection result) of the first lines (the driving lines) on which none of the keys is pressed and information of the second lines (the sensing lines) on which none of the keys is pressed may be obtained, so that positions of the keys need not to be scanned may be skipped according to said information. In the scan mode, the parallel comparison is performed through the first comparison circuit without calibration mechanism in order to obtain the coarse scan result, and then the press status of each key is obtained and whether the press status of each key is misjudged is determined according to the first detection result, the second detection result and the coarse scan result in the first scan stage. After the positions of the misjudged keys are configured, the re-determination is then performed for the misjudged keys through the second comparison circuit with calibration mechanism in the second scan stage. Since the information (the first detection result and the second detection result) obtained in the detection mode may be used to solve the issue of inaccurate determination by the first comparison circuit without calibration mechanism and reduce the number of the keys need to be re-determined by the second comparison circuit with calibration mechanism, the scan speed of the keyboard apparatus may be improved while precisely determining whether each key is pressed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A keyboard apparatus, comprising:
    a key module, comprising a plurality of keys, at least one first line and at least one second line, wherein the at least one first line and the at least one second line are coupled to the keys to drive the keys or sense the keys; and
    a controller, coupled to the at least one first line and the at least one second line, wherein
    the controller parallelly drives the at least one first line to an identical potential and parallelly detects whether at least one key on each of the at least one second line is pressed as a first detection result in a first detection stage;
    the controller sequentially selects one of the at least one first line and parallelly scans a press status of each key on the selected first line through the at least one second line so as to generate a coarse scan result in a first scan stage; and
    the controller obtains the press status of each of the keys and determines whether the press status of each of the keys is misjudged according to the first detection result and the coarse scan result in the first scan stage.

2. The keyboard apparatus of claim 1, wherein
    the controller parallelly drives the at least one second line to an identical potential and parallelly detects whether at least one key on each of the at least one first line is pressed as a second detection result in a second detection stage; and
    the controller replaces the first detection result by the second detection result, obtains the press status of each of the keys and determines whether the press status of each of the keys is misjudged according to the second detection result and the coarse scan result in the first scan stage.

3. The keyboard apparatus of claim 1, wherein
    the controller parallelly drives the at least one second line to an identical potential and parallelly detects whether at least one key on each of the at least one first line is pressed as a second detection result in a second detection stage; and
    the controller obtains the press status of each of the keys and determines whether the press status of each of the keys is misjudged according to the first detection result, the second detection result and the coarse scan result in the first scan stage.

4. The keyboard apparatus of claim 3, wherein the controller determines whether at least one of the keys is pressed according to the first detection result in the first detection stage and enters the second detection stage if a determination result is affirmative.

5. The keyboard apparatus of claim 3, wherein the controller determines whether at least one of the keys is pressed according to the first detection result or the second detection result in the second detection stage and enters the first scan stage if a determination result is affirmative.

6. The keyboard apparatus of claim 3, wherein the controller further determines whether the press status of each of the keys is misjudged according to the second detection result and a preset parameter in the first scan stage,
    wherein the controller calculates for a count value according to the second detection result and determines that the press status of each of the keys is not misjudged when the count value is less than the preset parameter.

7. The keyboard apparatus of claim 3, wherein the controller comprises:
    at least one first interface circuit, coupled to the at least one first line to drive or sense the at least one first line;
    at least one second interface circuit, coupled to the at least one second line to drive or sense the at least one second line;
    at least one first comparison circuit, coupled to the at least one second line;
    a processing circuit, coupled to the at least one first comparison circuit; and
    a driving circuit, coupled to the at least one first interface circuit, the at least one second interface circuit and the processing circuit, wherein
    in the first detection stage, the driving circuit parallelly drives the at least one first line to a first potential through the at least one first interface circuit, and the at least one second interface circuit compares a voltage of the at least one second line with a reference voltage to generate the first detection result;
    in the second detection stage, the driving circuit parallelly drives the at least one second line to the first potential through the at least one second interface circuit, and the at least one first interface circuit compares a voltage of the at least one first line with the reference voltage to generate the second detection result; and
    in the first scan stage, the processing circuit sequentially selects the one of the at least one first line, the processing circuit drives the selected one of the at least one first line to the first potential and drives the rest of the at least one first line to a second potential through the driving circuit and the at least one first interface circuit, and the at least one first comparison circuit receives the voltage of the at least one second line to serve as at least one first scan voltage and compares the at least one first scan voltage with a comparison voltage to generate the coarse scan result.

8. The keyboard apparatus of claim 7, wherein the controller further comprises:
a second comparison circuit, coupled to the at least one second line and the processing circuit,
wherein when the processing circuit determines that the press status of at least one of the keys is misjudged in the first scan stage, the processing circuit enters a second scan stage to drive the first line corresponding to the misjudged key to the first potential and drive the rest of the at least one first line to the second potential through the at least one first interface circuit and activates the second comparison circuit so that the second comparison circuit receives a voltage of the second line corresponding to the misjudged key to serve as a second scan voltage, and the second comparison circuit compares the second scan voltage with the comparison voltage to determine whether the misjudged key is pressed,
wherein the at least one first comparison circuit is a comparison circuit without calibration mechanism, and the second comparison circuit is a comparison circuit with calibration mechanism or an analog to digital converter with calibration mechanism.

9. The keyboard apparatus of claim 7, wherein the at least one first interface circuit or the at least one second interface circuit is at least one pad circuit or at least one general purpose input output (GPIO) circuit.

10. The keyboard apparatus of claim 7, wherein the processing circuit sequentially selects the one of the at least one first line according to the second detection result in the first scan stage, wherein at least one key on the selected first line is pressed.

11. The keyboard apparatus of claim 3, wherein the controller comprises:
at least one first interface circuit, coupled to the at least one first line to drive or sense the at least one first line;
at least one second interface circuit, coupled to the at least one second line to drive or sense the at least one second line;
a processing circuit, coupled to the at least one first interface circuit and the at least one second interface circuit; and
a driving circuit, coupled to the at least one first interface circuit, the at least one second interface circuit and the processing circuit, wherein
in the first detection stage, the driving circuit parallelly drives the at least one first line to a first potential through the at least one first interface circuit, and the at least one second interface circuit compares a voltage of the at least one second line with a reference voltage to generate the first detection result;
in the second detection stage, the driving circuit parallelly drives the at least one second line to the first potential through the at least one second interface circuit, and the at least one first interface circuit compares a voltage of the at least one first line with the reference voltage to generate the second detection result; and
in the first scan stage, the processing circuit sequentially selects the one of the at least one first line, the processing circuit drives the selected one of the at least one first line to the first potential and drives the rest of the at least one first line to a second potential through the driving circuit and the at least one first interface circuit, and the at least one second interface circuit compares a voltage of the at least one second line with a comparison voltage to generate the coarse scan result.

12. The keyboard apparatus of claim 11, wherein the controller further comprises:
a second comparison circuit, coupled to the at least one second line and the processing circuit,
wherein when the processing circuit determines that the press status of at least one of the keys is misjudged in the first scan stage, the processing circuit enters a second scan stage to drive the first line corresponding to the misjudged key to the first potential and drive the rest of the at least one first line to the second potential through the at least one first interface circuit and activates the second comparison circuit so that the second comparison circuit receives a voltage of the second line corresponding to the misjudged key to serve as a second scan voltage, and the second comparison circuit compares the second scan voltage with the comparison voltage to determine whether the misjudged key is pressed,
wherein the at least one first comparison circuit is a comparison circuit without calibration mechanism, and the second comparison circuit is a comparison circuit with calibration mechanism or an analog to digital converter with calibration mechanism.

13. The keyboard apparatus of claim 1, wherein whether the press status of the at least one key on each of the at least one second line is misjudged is related to a number of keys being pressed among the at least one key on each of the at least one second line.

14. A detection method for status of keys, adapted to a plurality of keys in a key module of a keyboard apparatus, and comprising:
in a first detection stage, parallelly driving at least one first line of the key module to an identical potential and parallelly detecting whether at least one key on each of at least one second line of the key module is pressed as a first detection result;
in a first scan stage, sequentially selecting one of the at least one first line and parallelly scanning a press status of each key on the selected first line through the at least one second line so as to obtain a coarse scan result; and
in the first scan stage, obtaining the press status of each of the keys and determining whether the press status of each of the keys is misjudged according to the first detection result and the coarse scan result.

15. The detection method for status of keys of claim 14, further comprising:
in a second detection stage, parallelly driving the at least one second line to an identical potential and parallelly detecting whether at least one key on each of the at least one first line is pressed as a second detection result; and
in the first scan stage, replacing the first detection result by the second detection result, and obtaining the press status of each of the keys and determining whether the press status of each of the keys is misjudged according to the second detection result and the coarse scan result.

16. The detection method for status of keys of claim 14, further comprising:
in a second detection stage, parallelly driving the at least one second line to an identical potential and parallelly detecting whether at least one key on each of the at least one first line is pressed as a second detection result; and in the first scan stage, obtaining the press status of each of the keys and determining whether the press status of each of the keys is misjudged according to the first detection result, the second detection result and the coarse scan result.

17. The detection method for status of keys of claim 16, wherein the first detection stage further comprises:

determining whether at least one of the keys is pressed according to the first detection result and entering the second detection stage if a determination result is affirmative.

18. The detection method for status of keys of claim 16, wherein the second detection stage further comprises:

determining whether at least one of the keys is pressed according to the first detection result or the second detection result and entering the first scan stage if a determination result is affirmative.

19. The detection method for status of keys of claim 16, wherein the first scan stage further comprises:

determining whether the press status of each of the keys is misjudged according to the second detection result and a preset parameter.

20. The detection method for status of keys of claim 19, wherein the step of determining whether the press status of each of the keys is misjudged according to the second detection result and the preset parameter comprises:

calculating for a count value according to the second detection result and determining that the press status of each of the keys is not misjudged when the count value is less than the preset parameter.

21. The detection method for status of keys of claim 16, wherein the step of parallelly driving the at least one first line of the key module to the identical potential and parallelly detecting whether the at least one key on each of the at least one second line of the key module is pressed as the first detection result in the first detection stage comprises:

parallelly driving the at least one first line to a first potential; and comparing a voltage of the at least one second line with a reference voltage to generate the first detection result.

22. The detection method for status of keys of claim 16, wherein the step of parallelly driving the at least one second line to the identical potential and parallelly detecting whether the at least one of keys on each of the at least one first line is pressed as the second detection result in the second detection stage comprises:

parallelly driving the at least one second line to a first potential; and comparing a voltage of the at least one first line with a reference voltage to generate the second detection result.

23. The detection method for status of keys of claim 16, wherein the step of sequentially selecting the one of the at least one first line and parallelly scanning the press status of each key on the selected first line through the at least one second line so as to generate the coarse scan result in the first scan stage comprises:

sequentially selecting the one of the at least one first line;

driving the selected one of the at least one first line to a first potential and driving the rest of the at least one first line to a second potential;

receiving a voltage of the at least one second line to serve as at least one first scan voltage; and comparing the at least one first scan voltage with a comparison voltage through at least one first comparison circuit to generate the coarse scan result, wherein the at least one first comparison circuit is a comparison circuit without calibration mechanism.

24. The detection method for status of keys of claim 23, wherein the step of sequentially selecting the one of the at least one first line comprises:

sequentially selecting the one of the at least one first line according to the second detection result, wherein at least one key on the selected first line is pressed.

25. The detection method for status of keys of claim 16, further comprising:

entering a second scan stage when determining that the press status of at least one of the keys is misjudged in the first scan stage, wherein the second scan stage comprises:

driving the first line corresponding to the misjudged key to a first potential and driving the rest of the at least one first line to a second potential;

activating a second comparison circuit so that the second comparison circuit receives a voltage of the second line corresponding to the misjudged key to serve as a second scan voltage; and comparing the second scan voltage with a comparison voltage to determine whether the misjudged key is pressed through the second comparison circuit, wherein the second comparison circuit is a comparison circuit with calibration mechanism or an analog to digital converter with calibration mechanism.

26. The detection method for status of keys of claim 14, wherein whether the press status of the at least one key on each of the at least one second line is misjudged is related to a number of keys being pressed among the at least one key on each of the at least one second line.

\* \* \* \* \*